(12) United States Patent
Booton

(10) Patent No.: US 6,337,857 B1
(45) Date of Patent: Jan. 8, 2002

(54) COMPUTER TELEPHONY INTEGRATED NETWORK

(75) Inventor: Laurence J Booton, Woodbridge (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/155,173

(22) PCT Filed: Apr. 20, 1998

(86) PCT No.: PCT/GB98/01135

§ 371 Date: Sep. 22, 1998

§ 102(e) Date: Sep. 22, 1998

(87) PCT Pub. No.: WO98/48557

PCT Pub. Date: Oct. 29, 1998

(30) Foreign Application Priority Data

Apr. 18, 1997 (GB) ............................................. 9707862
Apr. 18, 1997 (GB) ............................................. 9707863

(51) Int. Cl.$^7$ ............................................. H04L 12/66
(52) U.S. Cl. .................... 370/352; 379/93.09; 379/201; 370/260
(58) Field of Search ................................. 370/352, 356, 370/420, 260, 261, 270; 379/93.09, 93.11, 93.14, 173, 265, 266, 309, 204, 702, 201

(56) References Cited

U.S. PATENT DOCUMENTS

| 4,953,159 | A | * | 8/1990 | Hayden et al. | 370/265 |
| 5,206,901 | A | * | 4/1993 | Harlow et al. | 379/211 |
| 5,627,978 | A | * | 5/1997 | Altom et al. | 345/758 |
| 5,835,582 | A | * | 11/1998 | Matsuda et al. | 379/373 |

* cited by examiner

Primary Examiner—Douglas Olms
Assistant Examiner—Bob A. Phunkulh
(74) Attorney, Agent, or Firm—Nixon & Vanderhye P.C.

(57) ABSTRACT

The invention concerns an integrated computer and telephony system and a method of integrated computer telephony using at least one switch capable of receiving incoming telephone calls and of dialing outgoing calls; a computer terminal associated with the switch; memory means associated with said computer terminal and adapted to store a plurality of phone numbers said switch including a plurality of virtual telephones each corresponding in use to an individual one of said associated numbers; means for recognising that a telephone number connected to the switch as an incoming call is associated with at least some of said plurality of numbers; and means for causing said switch to call each of said associated numbers in parallel.

48 Claims, 6 Drawing Sheets

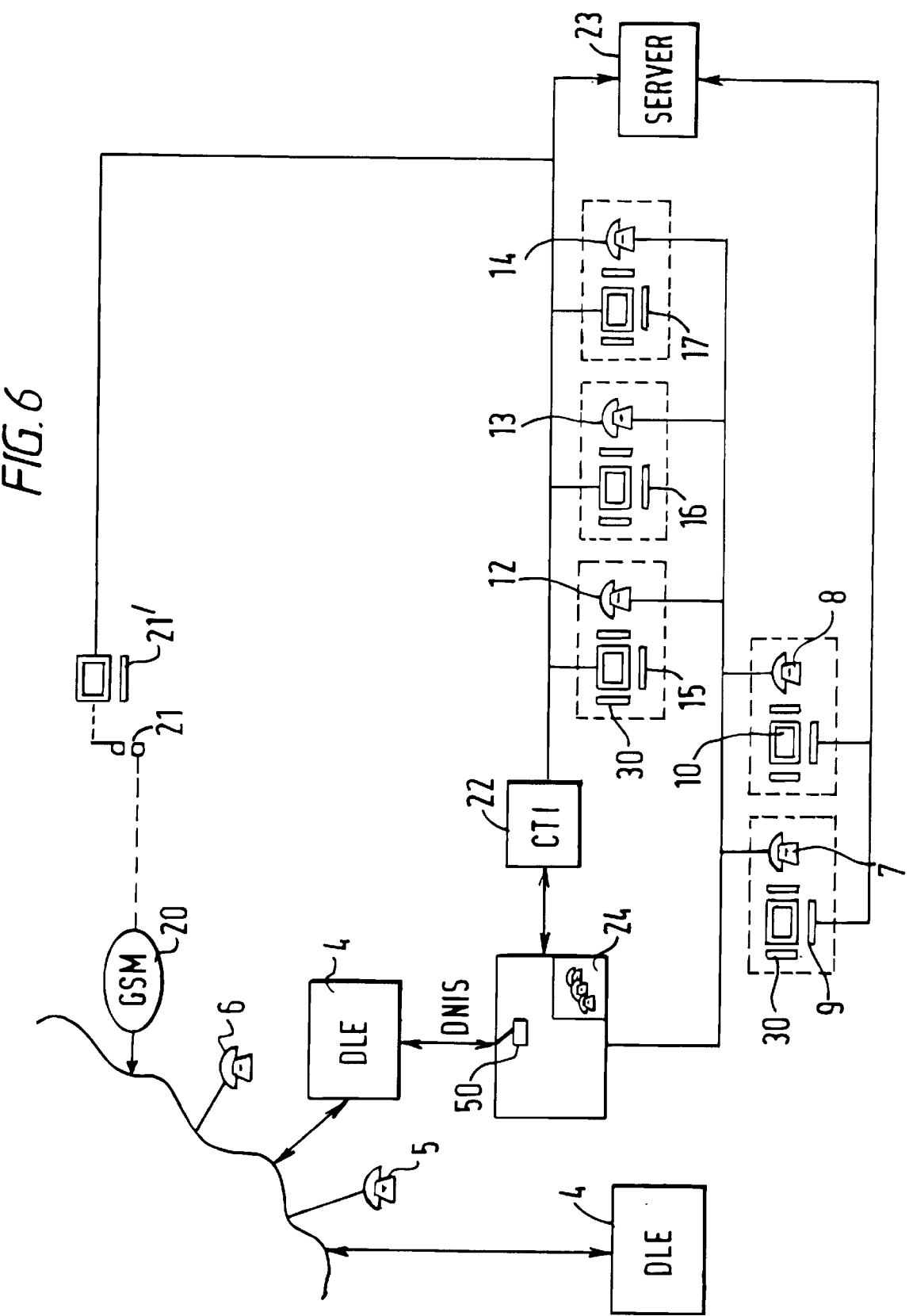

COMPUTER TELEPHONY INTEGRATED NETWORK

BACKGROUND OF THE INVENTION

1. Field of the Invention

The present invention concerns systems which utilise the combined capabilities of omputers and telephony.

2. Description of Related Art

Historically computers and telephony have occupied different areas in the overall field of technology with the exception of the increasing use of computer technology in controlling and managing telephone networks. However there is now a rapid convergence in these two areas so that the boundaries between computing and telephony are becoming harder to define. Thus computers, as well as being used to control telephones, can have special telephone interfaces that carry out the telephony functions; additionally information carried over telephone lines can be detected by computers and used to handle the calls more efficiently.

One of the forces driving the integration of computing and telephony is that modern businesses have a growing need to unite individuals in different locations into project teams. Another concept uniting computing and telephony is that of the "hot desk" where an individual does not necessarily have a single defined office location but may rather be migratory so that his/her office is defined at the point of logging-in to a computer terminal, a procedure which obviously can occur at widely spaced locations given the great increase in computer networks. Thus while the server of the computer network will know at log-on where the user is located this is not necessarily so for the user's telephone number.

European patent application number 0 549 126 A2 discloses in one embodiment an intelligent network-based service where a customer of the service can be allocated a special number, similar to an 800 number (0800 number in the United Kingdom), this special number being associated with a primary number (office telephone) and a secondary number (mobile telephone). A call made to this special number is recognised as such by the service switching point (SSP) local to the caller, which sends a request for routing instructions to the service control point (SCP).

The SCP performs a lookup operation and returns the primary and secondary numbers to the SSP, which proceeds to alert both numbers. The manner in which this is done depends on whether both numbers are on the same SSP or on different SSPs.

In another embodiment, a call is made to a normal directory number, i.e. is routed through the network to an SSP serving that directory number (primary number). That SSP performs a normal lookup operation to find the local line to be alerted, and the lookup returns an indication that database action is required. The SSP queries a database, receives one or more secondary telephone numbers, rings the primary number, sends a busy/idle status request to each SSP serving a secondary number, and then sends an alert request in respect of any of the secondary numbers that are idle. The SSP connects the incoming call to whichever of the alerted primary and secondary numbers is the first to go off-hook.

There is also disclosed alerting of multiple telephones in a conventional local telephone system, i.e. not an intelligent network. Upon receipt of an incoming, terminating, call, a local switch performs a normal lookup operation and finds that the dialled directory number is associated with another directory number. The local switch alerts the line corresponding to the dialled directory number and places an outgoing call via a trunk to another local switching office serving that other directory number. The local switch connects the incoming call to the line if off-hook is detected first, or the trunk if answer supervision is detected first.

GB Patent Specification No GB-A-2294178 (Fujitsu Limited) discloses a CTI arrangement comprising a switch unit with associated telephones, and a host unit connected to computer terminals. Generally, the telephones are associated with respective ones of the computer terminals. Thus, when the switch unit receives a call for one of its telephones, it rings that telephone and informs the host unit that it is applying ringing to that called directory number. The host unit performs a lookup to obtain the identity of the computer terminal associated with that telephone, and sends to that computer terminal an instruction for displaying a message corresponding to the alert.

Fujitsu Limited discloses several embodiments, including: the sharing of a common telephone by two users, each working at a respective computer terminal associated with that common telephone having two different directory numbers allocated to it; the delivery of a call to the intended recipient when he is logged on at a computer terminal which is not his "home" computer terminal; and the delivery of a call to a representative of the intended recipient. Where users have a fixed association with the telephones, the switch unit always rings the intended recipient and informs the host unit. In embodiments where users can log in at computer terminals other than their "home" computer terminal, the switch unit waits for the host unit to instruct it as to where the intended recipient, or his appointed representative, is located, i.e. the directory number to be rung, and rings that telephone, and the host unit independently instructs the relevant computer terminal to display the alert message.

U.S. Pat. No. 4,866,758 discloses that AT&T System 25, 75 and 85 data and voice communication systems comprise call processing software for supporting bridged call appearances whereby a call to one of a plurality of bridged terminals concurrently appears at the or each other of the bridged terminals, for example an executive and secretary arrangement.

The article "Facilities for users of SOPHO-SET feature phones by C. J. Boltjes, Philips Telecommunication and Data Systems Review, Vol. 48, No. 1, March 1990, Hilversum, NL, discloses analogue feature phones and digital feature phones for use with Philips SOPHO-S digital PABXs. These PABXs provide a group arrangement to enable a caller to be connected to a random member of the group. The feature phones have a display for displaying various numbers, e.g. calling party, originally called party, and have extension keys with LEDs. Thus, a member of that group can assign an extension key of his feature phone to that group, so that for an incoming group call, the display will show the group number dialled and the LED on that assigned "group" key will flash. This indicates the nature of the call and distinguishes it from a call to an individual. Other extension keys of his feature phone can be individually assigned to the other members of the group whereby for an incoming call made to a specific group member the PABX will cause flashing of the key assigned to that specific group member on each of the feature phones of the other members of that group.

Thus the present invention is concerned with the situation in which members of a work group can easily remain in touch independently of location, for example at multiple offices, at home and when mobile.

A system has evolved to meet these needs, which is known as Computer Telephony Integration (CTI). A set of protocols and standards for CTI have also arisen and these standards are known as Standards ECMA-217 SERVICES FOR COMPUTER SUPPORTED TELECOMMUNICATIONS APPLICATIONS PHASE I, and Standards ECMA-218 SERVICES FOR COMPUTER SUPPORTED TELECOMMUNICATIONS APPLICATIONS PHASE II.

In what follows it will be assumed that these standards are met by the specific embodiment to be described, but it will be appreciated that the inventive concept to be set out later does not necessarily demand that the protocols of the above standards are followed.

One system involving CTI has been developed by British Telecommunications Limited and is known as Distributed Office Technology (DOT). In a DOT network each telephone user has an associated terminal by means of which he/she can log into what can be referred to as a virtual work group. Once logged-on the user will be provided on the associated monitor with a visual indication of each member of the team. Both the telephony and physical status of each member of the virtual work group is thus displayed on the monitor, which can be the screen of a standard Personal Computer (PC) which acts as the terminal. Users may add and remove members from the work group at any time. This can be achieved by dragging and dropping a new individual from a directory onto the work group. When a user receives a phone call, not only does the telephone ring at the physical location but the user's icon will flash and a screen pop will appear. Every other member of the virtual work group who has logged in will be able to see that the particular member of the team has a call ringing. The user can analyse the screen pop, and answer or reject the call. The screen pop will at the very least give the number of the incoming call and, if available, the network database additional relevant information concerning the caller. However the fact that a system as just described has come into existence has been largely caused by the mobility of the members of the work group. An obvious result of such mobility is that an intended recipient of a call can be at one of many locations, which can include being at home where there may be no computer terminal, or actually travelling and thus only contactable on a mobile phone.

SUMMARY OF THE INVENTION

In one aspect the present invention is concerned with solving this problem.

In accordance with a first aspect of the present invention there is provided a Computer Telephony Integration (CTI) arrangement comprising a CTI-enabled switch, a store, and a CTI computer:

the CTI-enabled switch being arranged
(1) to respond to receipt of a call terminating thereon by
  (1a) retrieving a dialled directory number from signalling data of that terminating call, and
  (1b) sending to the CTI computer a route request signal including the retrieved dialled directory number of that terminating call,
(2) to respond to receipt of a route select signal from the CTI computer by
  (2a) applying ring back treatment in respect of that terminating call,
  (2b) holding that terminating call until receipt of a signal from the CTI computer for causing the connection of that terminating call to another call,
(3) to respond to receipt from the CTI computer of notification of calls to be made to a plurality of directory numbers by originating, in parallel, a call to each of said plurality of directory numbers,
(4) to respond to an answer condition of any of the originating calls by sending an answer signal in respect of that answered call to the CTI computer, and
(5) to respond to receipt from the CTI computer of a signal for causing the connection of that terminating call to that answered originating call by making that connection; the store being arranged to store a plurality of entries, each entry comprising a first part containing a single directory number, and a second part containing a plurality of directory numbers; and the CTI computer being arranged
(6) to respond to receipt from the CTI-enabled switch of that route request signal by
  (6a) sending to the CTI-enabled switch a route select signal,
  (6b) accessing the store in accordance with the retrieved dialled directory number of that terminating call
  (6c) retrieving the second part of the entry whose first part contains a directory number matching the retrieved dialled directory number of that terminating call
  (6d) sending to the CTI-enabled switch notification of calls to be made to the plurality of numbers of the retrieved second part, and
(7) to respond to receipt of a call answered signal from the CTI-enabled switch in respect of one of said originating calls, by sending to the CTI-enabled switch a signal for causing the connection of that terminating call to that answered originating call.

Preferably the system further comprises means for connecting one of said associated numbers with the source of said incoming call when that number has been answered, and of breaking connection to the remaining ones of said associated numbers which have not been answered.

In accordance with a second aspect of the present invention there is provided a method of operating a Computer Telephony Integration (CTI) arrangement comprising a CTI-enabled switch, a store, and a CTI computer, the method comprising the steps of:

at the CTI-enabled switch
(1) responding to receipt of a call terminating thereon by
  (1a) retrieving a dialled directory number from signalling data of that terminating call, and
  (1b) sending to the CTI computer a route request signal including the retrieved dialled directory number of that terminating call,
(2) responding to receipt of a route select signal from the CTI computer by
  (2a) applying ring back treatment in respect of that terminating call,
  (2b) holding that terminating call until receipt of a signal from the CTI computer for causing the connection of that terminating call to another call,
(3) responding to receipt from the CTI computer of notification of calls to be made to a plurality of directory numbers by originating, in parallel, a call to each of said plurality of directory numbers,
(4) responding to an answer condition of any of the originating calls to said plurality of directory numbers by sending an answer signal in respect of that answered call to the CTI computer, and
(5) responding to receipt from the CTI computer of a signal for causing the connection of that terminating call to that answered originating call by making that connection; storing in the store a plurality of entries, each entry comprising a first part containing a single directory number representing a respective user of the CTI arrangement, and a second part containing a plurality of directory numbers; and at the CTI computer (6) responding to receipt from the CTI-enabled switch of that route request signal by
   (6a) sending to the CTI-enabled switch a route select signal,
   (6b) accessing the store in accordance with the retrieved dialled directory number of that terminating call,
   (6c) retrieving the second part of the entry whose first part contains a directory number matching the retrieved dialled directory number of that terminating call,
   (6d) sending to the CTI-enabled switch notification of calls to be made to the plurality of numbers of the retrieved second part, and (7) responding to receipt of a call answered signal from the CTI-enabled switch in respect of one of said originating calls, by sending to the CTI-enabled switch a signal for causing to the connection of that terminating call to that answered originating call.

The present invention provides an advantage over the above mentioned prior disclosures of alerting of multiple telephones. No special network-based service number is required, and called users are contactable via conventional directory numbers whereby calls are routed through the network in conventional manner to the terminating switch serving that directory number. Previously, in the case where a secondary number was associated with the primary dialable directory number, the terminating switch always alerted the primary number. However, with the present invention, a user is not restricted to having a (primary) telephone always ring, and furthermore the determination and updating of his set of numbers to be rung is more easily managed by means of the CTI computer than by modification of the proprietary operating software of the switch.

In a preferred embodiment, the identities of a plurality of computer terminals linked in a network are stored in association with respective directory numbers of telephone terminals which are respectively associated with the computer terminals and to which the CTI-enabled switch can make originating calls, an indication is stored of each of said users who constitutes a member of a common user group, and a current telephony status is stored for each of said telephone terminals; and the CTI computer is connected to the network, and responsive to a member of the user group logging on at one of the plurality of computer terminals, to store a dynamic association of the identity of that member with the identity of that computer terminal while that member is logged on at that computer terminal, and to access that computer terminal to cause the display, for each member of the user group, of a respective user identity indication together with a respective associated current telephony status indication.

BRIEF DESCRIPTION OF THE DRAWINGS

In order that the present invention may be more readily understood, an embodiment thereof will now be described by way of example and with reference to the accompanying drawings in which:

FIG. 6 is a diagram showing a second embodiment of the present invention.

DETAILED DESCRIPTION OF EXEMPLARY EMBODIMENTS

Figure 1:
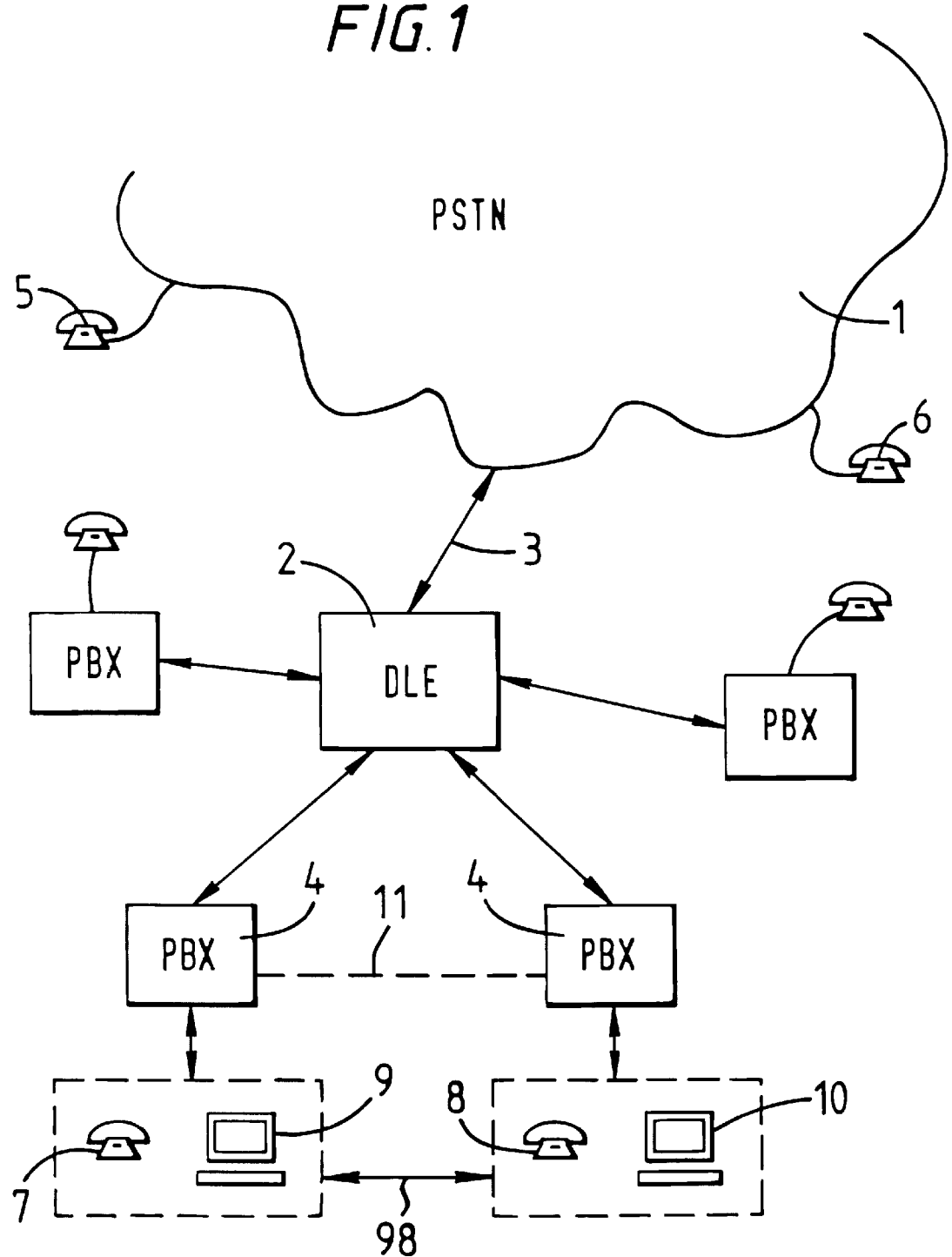
FIG. 1 is a diagram showing the general telephony environment in which the present invention operates.

Referring now to FIG. 1 of the accompanying drawings, 1 indicates the Public Switched Telephone Network (PSTN) and 2 indicates a Digital Local Exchange (DLE) connected to the PSTN by appropriate links 3. A pair of PBX's 4 are shown, connected again by appropriate links to the DLE 2. Naturally the complete system will have many more DLE's and PBX's.

Figure 2:
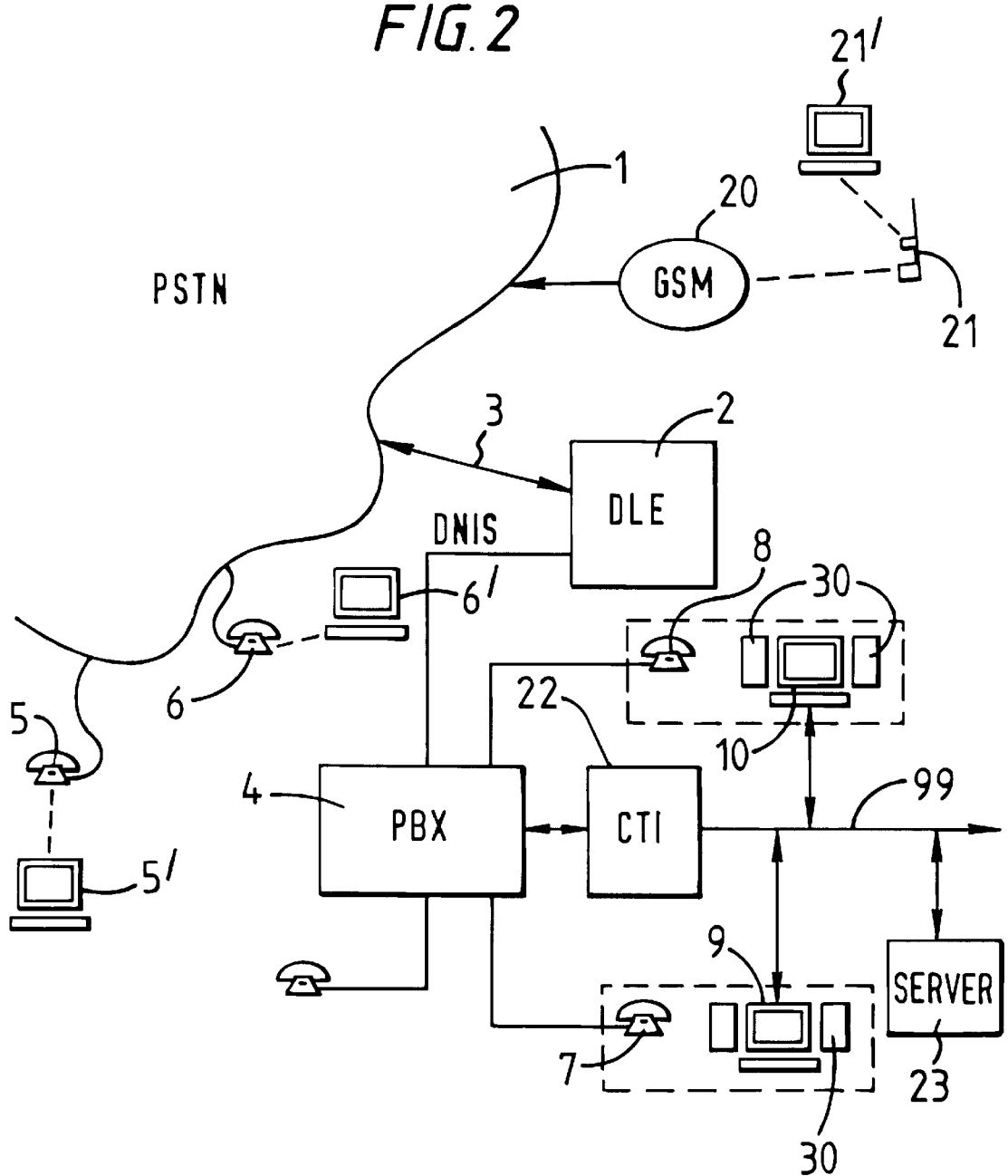
FIG. 2 is a more detailed diagram showing a part of a CTI network which incorporates the present invention.

FIG. 1 also shows individual telephones 5, 6 connected to the PSTN, and telephones 7 and 8 which are connected to the PBX's 4 and which are associated with computer terminals, also referred to as PC's, 9, 10 which are in turn connected to a conventional network server 23 (shown in FIG. 2). As shown by the dotted line 11, it is possible for the PBX's 4 to intercommunicate without having to route data via the PSTN. In a typical configuration call delivery to one of the PBX's 4 will be via Integrated Services Digital Network (ISDN) with Calling Line Identity (CLI) and Dialled Number Identification Service (DNIS). The PBX's 4 can be Meridian Option 81 (Registered Trade Mark of Northern Telecom Limited) PBX's which have been CTI enabled with a Meridian link (Registered Trade Mark of Northern Telecom Limited) for association with a CTI computer 22 (as shown in FIG. 2).

The servers from the computer side of the CTI network can be UNIX servers and the PC's can be general purpose computers operating in a Microsoft environment.

In FIG. 1 the telephones 5 and 6 are assumed to be located in users' homes and the telephones 7 and 8 and their associated PC's 9 and 10 located in an office environment. The dotted boxes surrounding telephone 7 and PC 9, and telephone 8 and PC 10, indicate that the telephone and the PC in each box are associated. This is of course purely by way of illustration. Additionally, link 98 indicates that the PC's 9 and 10 are part of a computer network. While the main links to the DLE and the PBX's will be digital, the home links can be analog. In the system shown in FIG. 1 it is not possible for an incoming call to cause each of the telephones shown to ring simultaneously.

Referring now to FIG. 2 of the accompanying drawings, integers in this figure which are common to FIG. 1 have been given the same reference numerals. FIG. 2 additionally shows a GSM 20 linked to the PSTN 1 and to a mobile phone 21, which is associated with a PC 21'.

In FIG. 2 the telephones 7 and 8 are shown connected to a common CTI-enabled PBX 4 which is connected to a CTI computer 22 connected to a Local Area Network (LAN) 99, to which are connected the PC's 9 and 10 and the UNIX server 23. The CTI-enabled PBX 4 also includes a set of "virtual" or "dummy" telephones 24 (shown in FIG. 6). The necessity for this will become apparent from the description of FIG. 3, which shows the flow of data transfer between the CTI-enabled PBX 4 of FIG. 2 and the CTI computer 22. The system shown in FIG. 2 enables an incoming call from the PSTN to cause simultaneous ringing on a selected plurality of phones so that a user can potentially be accessed at any one of a plurality of different locations, including a mobile phone. If one of the phones is answered then a connection is made between the incoming call and the answered phone and the other phones are disconnected.

The transfer of data between the CTI-enabled PBX 4 and the CTI computer 22 will now be described with regard to FIG. 3 of the drawings.

Figure 3:
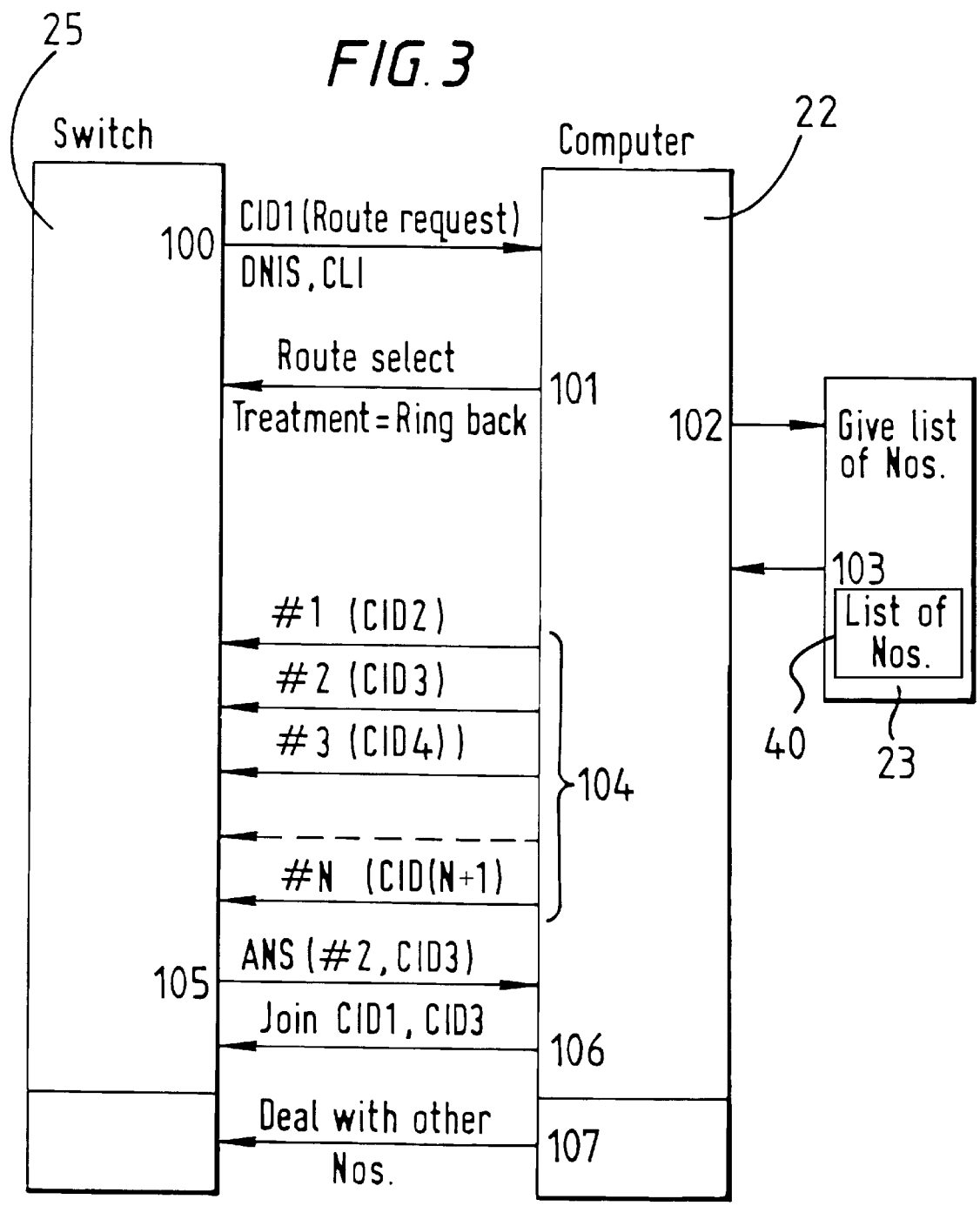
FIG. 3 is a diagram showing the flow of data between a CTI switch and a computer.

In FIG. 3 the CTI-enabled PBX 4 of FIG. 2 has been replaced by a general CTI-enabled switch indicated at 25. This is because the functions to be described can be carried out by different types of hardware. Thus CTI-enabled switch 25 could be an Interactive Voice Unit (IVU) or a PBX/ACD, that is an automatic call distributor.

The interaction between the CTI-enabled switch 25 and the CTI computer 22 is as follows:

at 100 the CTI-enabled switch 25 responds to an incoming call DNIS (FIG. 2) from the PSTN and generates a Route Request Signal for the received call. This call is labelled CID1. CID means Call ID and is a unique handle for that call, with the number ("1") indicating that it is the first call in this particular sequence.

In response to the route request (CID1) the CTI computer 22 at 101 returns to the switch a Route Select Signal (Ring Back) which causes the CTI-enabled switch to apply Ring Back treatment to that call. In other words, the calling party receives a ringing tone. At 102 the CTI computer 22 refers to its database, stored for example in hard discs of the server 23, and asks to be given a list of numbers. This list corresponds to potential locations for the intended recipient of the call and is indicated at 40. The list of numbers is returned from the server database to the CTI computer 22 at 103, and at 104 the CTI computer 22 sends a respective signal (make call) to the CTI-enabled switch 25 for each of the numbers (#1, #2, #3. . . #N) of that list. Whilst the CTI computer 22 is accessing the numbers list the incoming call is held in the CTI-enabled switch 25, as shown at 50 in FIG. 4. The CTI-enabled switch 25 responds to receipt from the CTI computer 22 of the signal containing the list of numbers by dialing, in parallel, the numbers of the list, allocating respective call identities CID2, CID3, CID4 . . . CID(N+1). It is for this reason that the dummy telephones shown at 24 are required, as it is necessary for the PSTN to believe that each of the numbers has an independent origin. When one of the dialled numbers is accepted the CTI-enabled switch 25 informs the CTI computer 22 at 105 that an answer has been received. As shown in FIG. 3, it is the call having the call identity CID3 in respect of the second number of the list, namely #2, which has been answered. The CTI computer 22 replies at 106 asking the CTI-enabled switch 25 to join the call CID1 to the call CID3, thus completing the call, i.e. connecting the incoming terminating call to the answering call. At the same time, at 107, the CTI computer 22, using the simplest scenario, sends a "deal with other calls" signal to the CTI-enabled switch 25, which responds by disconnecting the unanswered numbers (calls). As an alternative to the simple disconnection of the unanswered numbers (calls), the recipient of the call could be given the option to maintain the ringing of the other numbers so as to initiate a conference call once one or more of them have answered.

As the embodiment being described can be implemented in a CTI system such as the DOT system described hereinbefore, it will be appreciated that with the multiple call delivery system just described and where the call is delivered to one or more telephones associated with computer terminals, then it will be possible for any person at a terminal corresponding to a phone which has been rung by the multiple call delivery system to inspect the identity of the caller within the limits defined by the system and, if necessary, intercept the call.

Figure 4:
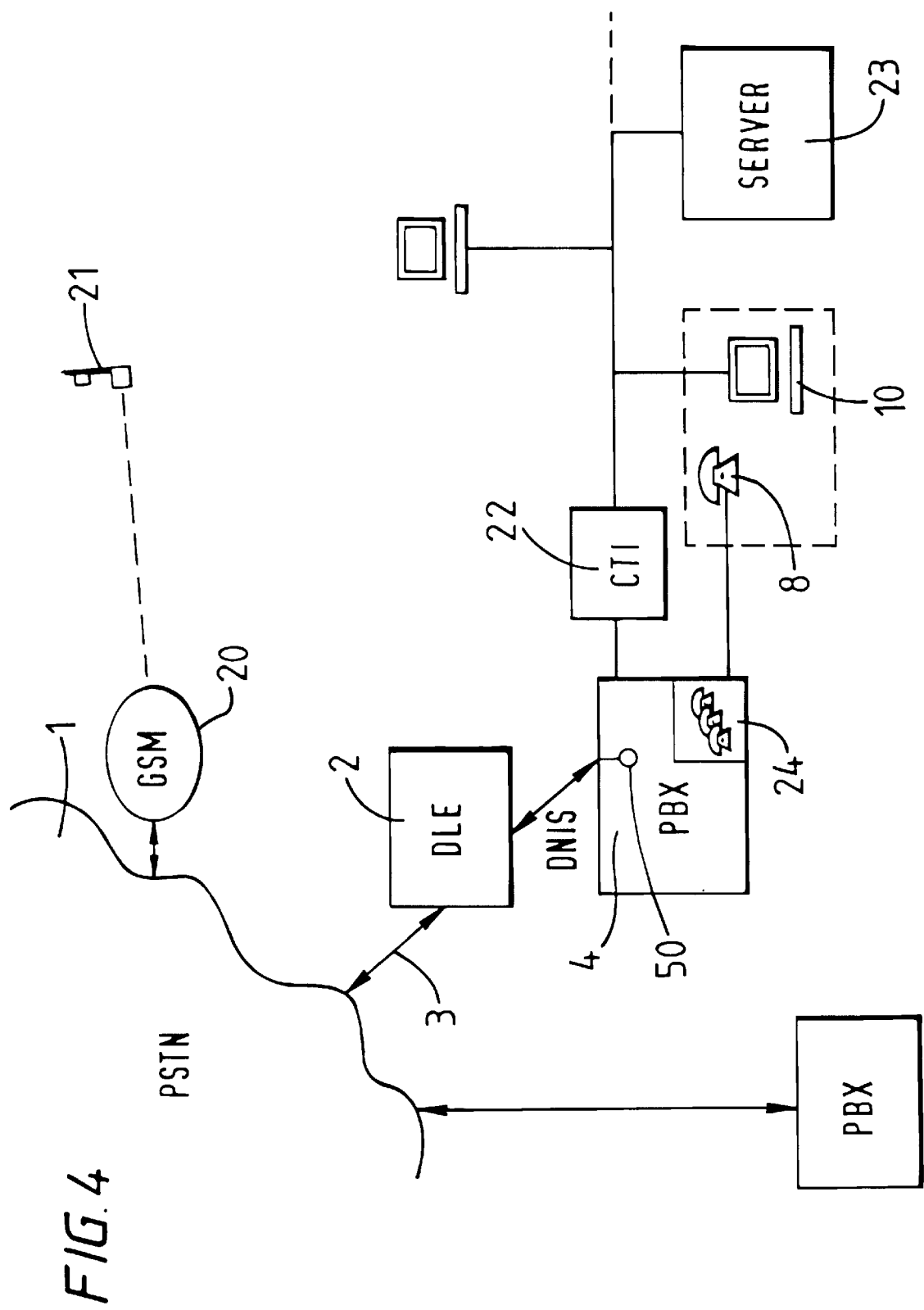
FIG. 4 is a diagram of a telephony system for alerting computers without ringing an associated phone.

Referring now to FIG. 4 of the drawings, integers in this figure which are common to FIGS. 1 and 2 have been given the same reference numerals.

In this embodiment the system is arranged so that an incoming call from the PSTN can cause a display on the monitor of a terminal associated with the incoming call without the necessity of the telephone itself ringing. Thus the incoming call is in effect held while the presence of the incoming call is indicated at the computer terminal. An additional feature is that when the receipt of an incoming call has been displayed in this manner, the computer network can also inform other members of the network of the fact that a call has been received.

Each office-based computer terminal, e.g. PC's 9 and 10, besides having an associated monitor also has a pair of loudspeakers 30 (see FIGS. 1 and 6). The other, including a lap top, computers can have a sound card and some form of loudspeaker. Because of this when an incoming call has been detected the computer terminals can generate a ringing tone similar to the ringing of a telephone though it is likely to be advantageous if it is differentiated from the ringing tone of the telephone immediately associated with it and also if it is distinguished from the pseudo-ringing tone of other computer terminals. As a feature each computer and its sound card may be arranged so as to emit a particular ringing tone which also distinguishes it from other computers when they are alerting their users of an incoming call. Additionally when an incoming call is received at the CTI-enabled PBX 4 this is displayed at each terminal which has logged on provided that the logged on terminals have indicated that they are interested in calls to that number. As the identity of the incoming caller is displayed at each of the appropriate logged on terminals users at each of these terminals can make an informed decision as to whether or not they wish to intercept the call even if it was not initially intended for them.

The transfer of data between the CTI-enabled PBX 4 and the CTI computer 22 to enable the above will now be described with regard to FIG. 3 of the drawings.

Figure 5:
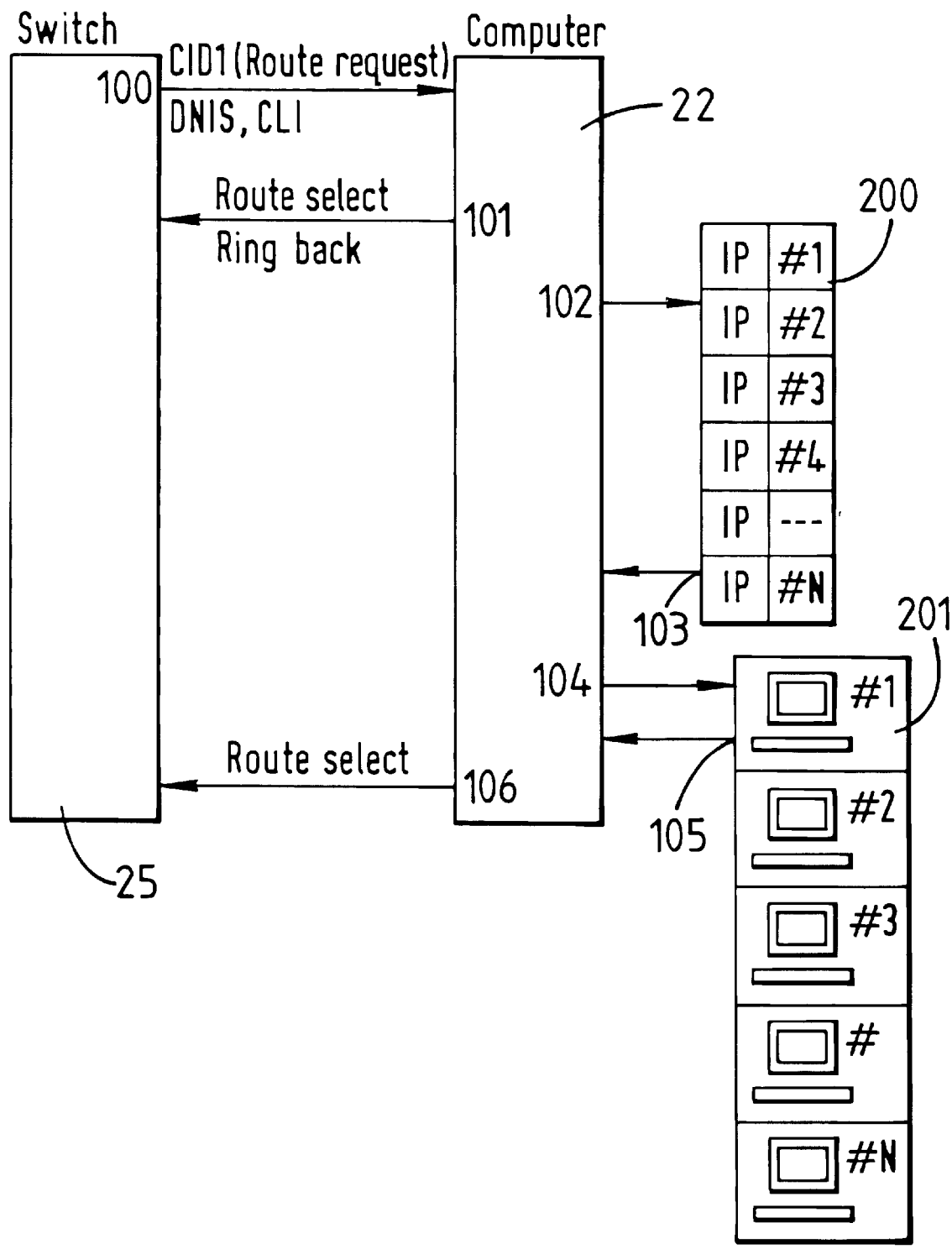
FIG. 5 is a diagram showing part of the flow of data in the system shown as FIG. 4.

In FIG. 5 the CTI-enabled PBX 4 of FIG. 4 has been replaced by a general CTI-enabled switch indicated at 25. This is because the functions to be described can be carried out by different types of hardware. Thus CTI-enabled switch 25 could be an Interactive Voice Unit (IVU) or a PBX/ACD, that is an automatic call distributor. In fact, the actual configuration of CTI-enabled switch 25 is not an essential factor in carrying out the present invention. This will be expanded upon hereinafter.

The interaction between the CTI-enabled switch 25 and the CTI computer 22 is as follows:

at 100 the CTI-enabled switch 25 responds to an incoming call DNIS (FIG. 2) from the PSTN and generates a Route Request Signal for the received call. This call is labelled CID1. CID means Call ID and is a unique handle for that call, with the number ("1") indicating that it is the first call in this particular sequence.

In response to the Route Request Signal (CID1) the CTI computer 22 at 101 returns to the CTI-enabled switch a Route Select Signal which, as described above, effectively ensures that the calling party receives a ringing tone. At 102 the CTI computer 22 refers to its database, stored for example in the hard discs of the server 23, and asks to be given a list of numbers. This list corresponds to locations of computer terminals for the various users which make up a virtual work group. The list of numbers is shown at 200 and contains the internet protocol numbers (IP) of the other members of the work group. The list of numbers are returned from the server database to the CTI computer 22 at 103, and at 104 the CTI computer 22 accesses the terminals corresponding to the received list of numbers on the computer network, this network being indicated at 201. It will be appreciated that there is a wide choice available of the terminals to be accessed in response to an incoming call. Thus it is possible for a user to define on an individual basis those terminals that he wishes to be accessed when his/her phone is rung by an incoming call. It is also possible for the source of an incoming call to be identified by its call identity so as automatically to access a stored list of numbers. At each of the terminals accessed in this way an indication of an incoming call can be given by the computer using its sound card and associated loudspeakers to generate a pseudo ringing tone. As already mentioned, each computer can generate a pseudo ringing tone which is differentiated from its neighbours. The alerted users at the accessed terminals can then make a decision whether or not they wish to intercept the call, with data concerning the incoming call being supplied by a suitable screen pop and/or by the audible indication which can, as will be described, be voice synthesis. If the initial recipient decides to take the incoming call this is indicated at 106 in FIG. 5. The data sent at 106 to the CTI-enabled switch will be a Route Select Signal such that the presence of the incoming call held at the CTI-enabled switch will cause the selected telephone number to ring. Of course the computer terminal will already have alerted the user of that phone that a call will be coming. If one of the users of the other alerted terminals decides to intercept the call, the CTI computer 22 will send a Route Select Signal 106 including the relevant data for the CTI-enabled PBX 4 to make a call to the telephone associated with terminal at which that intercepting user is logged on. The interception of the call can be done in a variety of manners. Thus a user can use a simple manual input via a key or a pointer device such as a mouse to indicate his/her interest in the call. Alternatively, the terminal could include voice recognition and respond to a voiced command. In this context it is possible for the computer, as well as generating a ringing tone, and perhaps a screen pop, to use voice synthesis to announce the arrival of the incoming call, for whom the call was initially intended, and the identity of the calling party. It is possible that no member of the virtual work group is present or wishes to intercept the call to which they have been alerted via their computer terminals. In such a case the system may include the possibility of diverting the incoming call to a voice mail facility.

In the system just described the flexibility allowed by the presence of the computer terminal can be utilised to provide further advantageous features. Thus the computer can be configured so as to respond in a variety of different ways on receipt of an incoming call from a source. In addition to providing a display giving information with regard to the source of the incoming call and also of giving a ring which is distinctive with respect either to a normal telephone call or to a computer-type alert, the computer can be programmed to give a variety of rings which can be used to indicate either the source of the incoming call or the fact that a particular member of the group has been rung so that the user can decide whether or not to intercept the call. Thus the computer terminal can give an indication not only of the source of the call but its intended recipient on another telephone number.

If the sound generating abilities of the computer include voice synthesis then the facility of indicating the source of an incoming call or the member of the group being rung can be achieved by appropriately programmed voice announcements and there again can be specified individually for each terminal.

Thus a wide range of options are provided in the system described to specify the manner in which each computer terminal gives an alert indication that an incoming call has been received at a number in the group.

It will be appreciated that although the term group has been used in the specification this term does not imply a single fixed group. Basically for any one user the group encompasses those numbers in which the user is interested. Thus the make up of a group can vary from user to user either under the user's own choice or as decided by some other person.

To give a simple example if there are four telephone numbers in the stored list the system can generate a different ringing tone for each number with each terminal using the same set of four ringing tones. Thus when the terminal of the intended recipient of an incoming call is logged in and is alerted he/she will hear the ringing tone associated with that terminal, and the other terminals within the group, which will also have been alerted, will give the same ringing tone and thus indicate to their users that somebody is trying to access a member of the group though not that specific terminal.

It is of course possible for each computer terminal to be individually configured so as to give confirmed alert indications which although specific to that terminal nevertheless differentiate between the various members of the group.

Another feature is that whilst a member of the group has not logged his/her terminal into the system, the terminal of those members of the group which have logged in will nevertheless give to their users indication that the incoming call has been received at the CTI-enabled switch.

It will thus be appreciated that the system described has a number of advantages.

A user can immediately identify an incoming call without actually answering it. Additionally when the members of the group are rung a user can be made aware of both the source and the destination of the incoming call and make a decision whether or not to intercept the call. The indication of an incoming call can be made in a number of different ways which can be individually tailored for each individual. The user can also be informed with regard to calls to other members of the group and can take appropriate action.

It will also be possible to combine the ringing in parallel of telephones within a group as described with regard to FIGS. 2 and 3 with providing non-telephone ringing indications as described with regard to FIGS. 4 and 5 at computer terminals associated with other telephones within the group.

In a simple example a member of the group might have three or four phone numbers associated with him. These could be a home number, an office number, a mobile number and a hotel number.

Thus the system just described with receipt of an incoming call, rings all four numbers. However, other members of the group also are logged in may wish to monitor incoming calls but not wish to have their phones ring by a call intended for this particular number unless they specifically wish to intercept the call. In such a case the system configuration shown in FIG. 6 can be used.

In FIG. 6 integers which are common to FIGS. 2 and 4 have the same reference numerals and will not be described again.

In this FIG. 6 additional telephones 12, 13 and 14 are shown each with a respective associated computer 15, 16 and 17, the computers having loudspeakers 30.

The configuration of the telephones 7, 8, 12, 13 and 14 and their associated computers can be set by their users so that either of the procedures described with regard to FIGS. 2 and 4 can be carried out. Thus one user can specify multiple ringing as described with regard to FIGS. 2 and 3. For example, the user could specify telephones 6, 7 and 21. The remaining terminals 15, 16 and 17 can be set so as to provide alert indications as already described. Thus an incoming call to the first user will cause simultaneous ringing on his specified phones, the other in the group will receive computer based alerts as already described.

Thus in effect the flow diagram of FIGS. 3 and 5 will be combined.

Thus as an example if an incoming call arrives at the PBX, the system will from the list of numbers stored at 200 return both the numbers to be rung in parallel and the terminals if they have been logged in, to be alerted. This is shown at 103 in FIGS. 3 and 5.

If a ringing phone is answered then step 106 of FIG. 3 follows, whilst if a user at a computer terminal decides to intercept the call step 105 of FIG. 5 is carried out.

The preceding description has been directed to various specific types of switches such as are currently used in telephony. There is an increasing trend to utilise switching techniques which are purely computer based or which are based on computers associated with telephone cards. The exact nature of the switching system has no real relevance to the basic inventive concept of supplying in parallel multiple calls in response to a single incoming terminating call. Thus the switch associated with the computer could also be a network switch, such as a public telephone exchange, or any switch operated by a third party operator or a telephony company.

What is claimed is:

1. A Computer Telephony Integration (CTI) arrangement comprising:
    a CTI-enabled switch,
    a lookup table, and
    a CTI computer;
    the CTI-enabled switch being arranged to perform the following:
        (1) to respond to receipt of a call terminating thereon by:
            (1a) retrieving a dialled directory number from signalling data of said terminating call, and
            (1b) sending to the CTI computer a route request signal including the retrieved dialled directory number of said terminating call,
        (2) to respond to receipt of a route select signal from the CTI computer by:
            (2a) applying ring back treatment with respect to said terminating call,
            (2b) holding said terminating call until receipt of a signal from the CTI computer for causing the connection of said terminating call to another call,
        (3) to respond to receipt from the CTI computer of notification of calls to be made to a plurality of directory numbers by originating, in parallel, a call to each of said plurality of directory numbers,
        (4) to respond to an answer condition of any of the originating calls by sending an answer signal with respect to that answered call to the CTI computer, and
        (5) to respond to receipt from the CTI computer of a signal for causing the connection of said terminating call to said answered originating call by making a connection;
    the lookup table being arranged to store a plurality of entries, each entry comprising a first part containing a respective directory number associated with a respective user of the CTI arrangement, and a second part containing a plurality of directory numbers; and
    the CTI computer being arranged to perform the following:
        (6) to respond to receipt from the CTI-enabled switch of said route request signal by:
            (6a) sending to the CTI-enabled switch a route select signal,
            (6b) accessing the lookup table in accordance with the retrieved dialled directory number of said terminating call,
            (6c) retrieving the second part of the entry whose first part contains a directory number matching the retrieved dialled directory number of said terminating call,
            (6d) sending to the CTI-enabled switch notification of calls to be made to the plurality of numbers of the retrieved second part, and
        (7) to respond to receipt of a call answered signal from the CTI-enabled switch with respect to one of said originating calls, by sending to the CTI-enabled switch a signal for causing the connection of said terminating call to said answered originating call.

2. A CTI arrangement according to claim 1, wherein the CTI computer is further responsive to the receipt of the call answered signal to send to the CTI-enabled switch a disconnect signal with respect to all the originating calls other than said answered originating call.

3. A CTI arrangement according to claim 1, and further comprising:
    at least a plurality of telephone terminals to which the CTI-enabled switch can make respective originating calls; and
    at least a corresponding plurality of computer terminals linked in a network and being respectively associated with said plurality of telephone terminals;
    wherein the lookup table is further arranged to store an indication of each of said users who constitutes a member of a common user group in association with respective ones of said plurality of directory numbers, the identities of said plurality of computer terminals, the directory numbers and current telephony operational status of the associated telephone terminals; and
    wherein the CTI computer is connected to the network, and responsive to a member of the user group logging-on at one of the plurality of computer terminals, to store a dynamic association of the identity of that member with the identity of that computer terminal while that member is logged on at that computer terminal, and to access that computer terminal to cause the display, for each member of the user group, of a respective user identity indication together with a respective associated current telephony operational status indication.

4. A CTI arrangement according to claim 3, wherein the CTI computer is arranged to respond to receipt from the CTI-enabled switch of said route request signal by accessing respective ones of the computer terminals dynamically associated with logged-on members of the user group to cause the display of an incoming call indication with respect to the user associated with the retrieved dialled directory number of said terminating call, that user being the intended recipient.

5. A CTI arrangement according to claim 1, and further comprising:
- at least a plurality of telephone terminals to which the CTI-enabled switch can make respective originating calls; and
- at least a corresponding plurality of computer terminals linked in a network and being respectively associated with said plurality of telephone terminals;
- wherein the lookup table is further arranged to store the identities of said plurality of computer terminals, the directory numbers and a current telephony operational status of the associated telephone terminals, and, for each of the users, an indication of whether that user is a member of a respective work group effectively comprising the identities of those computer terminals which are to be accessed in response to receipt of a call for that respective user, and being representative of users who have indicated an interest in calls to that respective user; and
- wherein the CTI computer is connected to the network, and responsive to receipt from the CTI-enabled switch of that route request signal to access the respective computer terminals dynamically associated with logged-on members of the respective work group corresponding to the retrieved dialled directory number of said terminating call to cause the display of an incoming call indication with respect to the user associated with the intended recipient.

6. A CTI arrangement according to claim 5, wherein the CTI computer is responsive to receipt of an intercept command from a user at a said respective one of the computer terminals to send to the CTI-enabled switch a signal containing the directory number of the telephone terminal associated with said respective one of the computer terminals whereby the CTI-enabled switch will cause that telephone terminal to ring for answering by the intercepting user.

7. A CTI arrangement according to claim 3, wherein the CTI computer is further arranged to ascertain whether there is a user group associated with the entry whose first part contains a directory number matching the retrieved dialled directory number of said terminating call, and, if so, to access the computer terminal dynamically associated with the intended recipient to cause a display of an incoming call indication.

8. A CTI arrangement according to claim 7, wherein the CTI computer is further arranged to access the respective computer terminals dynamically associated with logged-on members of that associated user group, other than the computer terminal associated with the intended recipient, to cause the display of an incoming call indication in association with the displayed identity indication of the intended recipient.

9. A CTI arrangement according to claim 1, wherein at least one of said plurality of computer terminals has an associated loudspeaker and is arranged to emit an audible indication upon being accessed by the CTI computer.

10. A CTI arrangement according to claim 9, wherein two or more of said plurality of computer terminals are so arranged to emit said audible indication, and are further arranged such that the respective audible indications are different from one another.

11. A CTI arrangement according to claim 9, wherein two or more of said computer terminals are so arranged to emit said audible indication, and are further arranged, upon being accessed by the CTI computer to display the identity indication of the intended recipient, additionally to emitting a respective audible indication corresponding to the called member.

12. A CTI arrangement according to claim 4, wherein the CTI-enabled switch is further arranged to retrieve a calling line identity from said signalling data and to send the retrieved calling line identity to said CTI computer.

13. A CTI arrangement according to claim 12, wherein, upon receipt of the retrieved calling line identity, the CTI computer either (i) accesses a calling line identity to calling person identity lookup table and sends the corresponding calling person identity, with or without the retrieved calling line identity, to each accessed computer terminal for display thereat, or (ii) sends the retrieved calling line identity by itself to each accessed computer terminal for display thereat.

14. A CTI arrangement according to claim 13, wherein at least one of the computer terminals is arranged to convert a received calling person identity and/or a received calling line identity to synthesized speech audio output.

15. A method of operating a Computer Telephony Integration (CTI) arrangement comprising a CTI-enabled switch, a lookup table, and a CTI computer, the method comprising the steps of:
- at the CTI-enabled switch performing the following:
  - (1) responding to receipt of a call terminating thereon by:
    - (1a) retrieving a dialled directory number from signalling data of said terminating call, and
    - (1b) sending to the CTI computer a route request signal including the retrieved dialled directory number of said terminating call,
  - (2) responding to receipt of a route select signal from the CTI computer by:
    - (2a) applying ring back treatment with respect to said terminating call,
    - (2b) holding said terminating call until receipt of a signal from the CTI computer for causing the connection of said terminating call to another call,
  - (3) responding to receipt from the CTI computer of notification of calls to be made to a plurality of directory numbers by originating, in parallel, a call to each of said plurality of directory numbers,
  - (4) responding to an answer condition of any of the originating calls to said plurality of directory numbers by sending an answer signal with respect to said answered call to the CTI computer, and
  - (5) responding to receipt from the CTI computer of a signal for causing the connection of said terminating call to said answered originating call by making that connection;
- storing in the lookup table a plurality of entries, each entry comprising a first part containing a respective directory number associated with a respective user of the CTI arrangement, and a second part containing a plurality of directory numbers; and at the CTI computer performing the following:
  - (6) responding to receipt from the CTI-enabled switch of said route request signal by:
    - (6a) sending to the CTI-enabled switch a route select signal,
    - (6b) accessing the lookup table in accordance with the retrieved dialled directory number of said terminating call,
    - (6c) retrieving the second part of the entry whose first part contains a directory number matching the retrieved dialled directory number of said terminating call, (6d) sending to the CTI-enabled switch notification of calls to be made to the plurality of numbers of the retrieved second part, and (7) responding to receipt of a call answered signal from the CTI-enabled switch with respect to one of said originating calls, by sending to the CTI-enabled switch a signal for causing the connection of said terminating call to said answered originating call.

16. A method according to claim 15, wherein the step of responding to receipt at the CTI computer of the call answered signal further comprises sending to the CTI-enabled switch a disconnect signal with respect to all the originating calls other than that answered originating call.

17. A method according to claim 15, wherein the identities of a plurality of computer terminals linked in a network are stored in association with respective directory numbers of telephone terminals which are respectively associated with the computer terminals and to which the CTI-enabled switch can make originating calls, an indication is stored of each of said users who constitutes a member of a common user group, and a current telephony status is stored for each of said telephone terminals; and further including the step of responding to a member of the user group logging on at one of the plurality of computer terminals by dynamically associating the identity of that member with the identity of that computer terminal, and accessing that computer terminal to cause the display, for each member of the user group, of a respective user identity indication together with a respective associated current telephony status indication.

18. A method according to claim 17, and including the further step of responding to receipt from the CTI-enabled switch of said route request signal by accessing respective ones of the computer terminals which are dynamically associated with logged-on members of the user group to cause the display of an incoming call indication with respect to the intended recipient.

19. A method according to claim 15, wherein the identities of a plurality of computer terminals linked in a network are stored in association with respective directory numbers of telephone terminals which are respectively associated with the computer terminals and to which the CTI-enabled switch can make originating calls, for each of said users, there is stored a respective work group effectively comprising the identities of those computer terminals which are to be accessed in response to receipt of a call for that respective user, and being representative of users who have indicated an interest in calls to that respective user, and a current telephony operational status is stored for each of said telephone terminals; and further including the step of responding to receipt from the CTI-enabled switch of said route request signal by accessing the respective computer terminals dynamically associated with logged-on members of the respective work group corresponding to the retrieved dialled directory number of said terminating call to cause the display of an incoming call indication with respect to the intended recipient.

20. A method according to claim 19, further including the step of responding to an intercept command from a user at a respective one of the computer terminals by sending to the CTI-enabled switch a signal containing the directory number of the telephone terminal associated with said respective one of the computer terminals whereby the CTI-enabled switch will cause that telephone terminal to ring for answering by the intercepting user.

21. A method according to claim 17, further including, in addition to retrieving the second part of the entry whose first part contains a directory number matching the retrieved dialled directory number of that terminating call, the steps of ascertaining whether there is an associated user group, and if so, accessing the computer terminal dynamically associated with that called member to cause the display of an incoming call indication.

22. A method according to claim 21, including the further step of accessing the respective computer terminals dynamically associated with logged-on members of that associated user group, other than the computer terminal associated with the intended recipient, to cause a display of an incoming call indication in association with the displayed identity indication of the intended recipient.

23. A method according to claim 21, wherein said computer terminal responds to being accessed by generating an audible indication in respect of an incoming call.

24. A method according to claim 23, wherein respective different audible indications are generated at two or more of said plurality of computer terminals.

25. A method according to claim 23, wherein the accessing of computer terminals associated with logged-on members, other than the intended recipient, causes the generation of an audible indication corresponding to the intended recipient.

26. A method according to claim 18, further including the steps of retrieving a calling line identity from said signalling data of that terminating call, sending the retrieved calling line identity to the CTI computer, and sending the retrieved calling line identity from the CTI computer to each accessed computer terminal for display thereat.

27. A method according to claim 26, wherein, upon receipt of the retrieved calling line identity, the CTI computer either (i) accesses a calling line identity to calling person identity lookup table and sends the corresponding calling person identity, with or without the retrieved calling line identity, to each accessed computer terminal for display thereat, or (ii) sends the retrieved calling line identity by itself to each accessed computer terminal for display thereat.

28. A method according to claim 26, further including the step of converting with at least one said accessed computer terminal a received calling line identity and/or calling person identity to synthesised speech audio output.

29. An integrated computer and telephony system comprising:

at least one switch capable of receiving incoming telephone calls and capable of dialing outgoing calls;

a computer associated with the switch;

memory associated with said computer and adapted to store a plurality of phone numbers, said switch including a plurality of virtual telephones each corresponding in use to an individual one of associated numbers;

an unit which recognizes that a telephone number provided to the switch as an incoming call is associated with at least some of said plurality of numbers;

an unit which causes said switch to call each of said associated numbers in parallel; and a plurality of computer terminals linked in a network, said network operatively coupled to said switch, and a plurality of telephones each associated with a computer terminal;

wherein a group of users is defined for the terminals and telephones; and when a user is logged into the network, a monitor associated with that user is enabled to display the constituent members of the group together with an operational telephone status of various members.

30. A system according to claim 29, wherein when said plurality of numbers have been called in parallel, a caller identity is displayed on those computer terminals associated with dialled telephones.

31. A system as claimed in claim 30, wherein each of those computer terminals associated with dialled telephones provide an indication that an incoming call has been received to those computer terminals not associated with the incoming call, the indication identifying the intended recipient of the incoming call.

32. A system as claimed in claim 31, wherein at least one computer terminal has an associated loudspeaker that is capable of emitting an audible indication that an incoming call has been received.

33. A system as claimed in claim 32, wherein the audible indication from each computer terminal is audibly differentiated from an audible indication from any other computer terminal.

34. A system as claimed in claim 33, wherein when an audible indication is provided by a loudspeaker associated with a computer terminal not directly associated with the incoming call, the audible indication being unique to the intended recipient of the incoming call.

35. A system according to claim 29, further comprising a screen pop generator which generates a screen of each terminal accessed in response to the receipt of an incoming call.

36. A system as claimed in claim 34, wherein each computer terminal can be independently programmed to provide audible indications of telephone numbers which are unique to that computer terminal.

37. A system according to claim 30, wherein at least some of the computer terminals are responsive to vocal commands.

38. A system according to claim 30, wherein at least one of the computer terminals is capable of voice synthesis and is capable of providing call identification using said voice synthesis.

39. A method of integrated computer and telephony:

receiving incoming telephone calls and dialing outgoing calls with at least one switch;

storing in memory a plurality of phone numbers with said switch including a plurality of virtual telephones each corresponding in use to an individual one of associated numbers;

recognizing that a telephone number provided to the switch as an incoming call is associated with at least some of said plurality of numbers;

causing said switch to call each of said associated numbers in parallel; and providing a plurality of computer terminals linked in a network which is operatively coupled to said switch and a plurality of telephones each associated with a computer terminal, and defining a group of users for the terminals and telephones;

wherein when a user is logged into the network, a monitor associated with that user displays constituent members of the group together with an operational telephone status of various members.

40. A method according to claim 39, wherein when said plurality of numbers have been called in parallel, a caller identity is displayed on those computer terminals associated with dialled telephones.

41. A method as claimed in claim 40, wherein each of those computer terminals associated with said dialled telephones provide an indication that an incoming call has been received to those computer terminals not directly associated with the incoming call, the indication identifying the intended recipient of the incoming call.

42. A method as claimed in claim 41, wherein at least one computer terminal has an associated loudspeaker that is capable of emitting an audible indication that an incoming call has been received.

43. A method as claimed in claim 42, wherein the audible indication from each computer terminal is audibly differentiated from any other computer terminal.

44. A method as claimed in claim 43, wherein the audible indication is provided by a loudspeaker associated with a computer terminal not directly associated with the incoming call, and the audible indication is one which is unique to the intended recipient of the incoming call.

45. A method according to claim 39, further including generating a screen pop at a screen of each terminal accessed in response to the receipt of an incoming call.

46. A method as claimed in claim 39, wherein each computer terminal can be independently programmed to provide audible indications of telephone numbers which are unique to that computer terminal.

47. A method according to claim 39, wherein at least some of the computer terminals are responsive to vocal commands.

48. A method according to claim 39, wherein at least one of the computer terminals is capable of voice synthesis and is capable of providing call identification using said voice synthesis.

* * * * *